United States Patent [19]

Schmitt et al.

[11] Patent Number: 5,218,379

[45] Date of Patent: Jun. 8, 1993

[54] PHOTOGRAPHIC MATERIAL CLAMP

[75] Inventors: Johannes W. Schmitt, Honeoye; Kenneth R. Vorndran, Rochester, both of N.Y.

[73] Assignee: Eastman Kodak Company, Rochester, N.Y.

[21] Appl. No.: 765,808

[22] Filed: Sep. 26, 1991

[51] Int. Cl.⁵ .................... G01D 15/24; G01D 15/26; G01D 15/34
[52] U.S. Cl. .................................. 346/138; 271/82; 271/277
[58] Field of Search ................. 346/138; 271/82, 276, 271/277

[56] References Cited

U.S. PATENT DOCUMENTS

| 3,906,512 | 9/1975 | Farlow | 346/138 |
|---|---|---|---|
| 4,111,119 | 9/1978 | Takizawa et al. | 101/127.1 |
| 4,386,771 | 6/1983 | Lakdawala | 271/82 |
| 4,390,176 | 6/1983 | Kato | 271/270 |
| 4,660,825 | 4/1987 | Umezawa | 271/276 |
| 4,718,659 | 1/1988 | Hayashi | 271/277 X |
| 4,815,870 | 3/1989 | Sparer et al. | 400/120 |
| 4,903,957 | 2/1990 | Binder et al. | 271/277 |
| 4,982,207 | 1/1991 | Tunmore et al. | 346/138 |
| 5,009,509 | 4/1991 | Matoushek et al. | 346/138 |
| 5,142,305 | 8/1992 | Maslanka et al. | 346/138 |

FOREIGN PATENT DOCUMENTS 0249833 10/1990 Japan .................................. 271/277

Primary Examiner—A. T. Grimley
Assistant Examiner—Sandra L. Brasé
Attorney, Agent, or Firm—Robert L. Randall

[57] ABSTRACT

A photographic material clamping apparatus includes a rotatable drum that has a longitudinally extending central axis, a longitudinal opening offset from the central axis, and a plurality of radial openings extending between the drum surface and the longitudinal opening. A cover member overlies the plurality of radial openings. A counterweight is positioned in the longitudinal opening and is connected to the cover member. Spring means act on the counterweight to urge the cover member towards the surface of the drum to grip a piece of photographic material inserted between the cover member and the drum.

18 Claims, 2 Drawing Sheets

PHOTOGRAPHIC MATERIAL CLAMP

TECHNICAL FIELD OF THE INVENTION

This invention pertains to image recording, and, more particularly, to a rotating drum to which photographic material is clamped for printing an image.

BACKGROUND OF THE INVENTION

In image reproduction systems, such as photography and thermal printing, receiver media is tightly held to a rotating drum. It is desirable to clamp both the top or leading edge and bottom or trailing edge of the receiver media against the rotating drum to produce a crisp image. It is also important that the reproduction apparatus conserve space. Toshifumi Kato U.S. Pat. No. 4,390,176 which issued Jun. 28, 1983, discloses a sheet clamping device which is used to clamp both the leading and trailing ends of a receiver sheet while the sheet is disposed around the peripheral surface of a drum rotating in a given direction. The sheet clamping device uses cams and levers to engage and disengage the receiver media which makes the device bulky. Accordingly, it will be appreciated that it will be highly desirable to have a sheet clamping apparatus which is simple in construction and conserves space.

In conventional digital image recorders, spring loaded piano type hinge clamps have been successfully used. Unfortunately, the same piano type hinge is unsuitable for a small diameter drum because, on a small diameter drum, a large percentage of lost space around the circumference exists. The wasted space exists because of the space required for actuation and spring levers used with the hinge. It is desirable to have a photographic material clamp that clamps both the top and bottom ends of the receiver sheet while occupying a minimal amount of the circumferential area of the drum. It is also desirable to have a photographic material clamp which does not have levers, cams and springs external to the drum and which would conserve space.

SUMMARY OF THE INVENTION

The present invention is directed to overcoming one or more problems set forth above. Briefly summarized, according to one aspect of the invention, a photographic material clamping apparatus includes a rotatable drum that has first and second end portions, a surface area extending between end portions, a central axis extending longitudinally between the end portions, a longitudinal opening offset from the central axis, and a plurality of radial openings extending between the drum surface and the longitudinal opening. A cover member overlies the plurality of radial openings. A counterweight is positioned in the longitudinal opening and is connected to the cover member. Spring means act on the counterweight to urge the cover member towards the surface of the drum.

The photographic material clamping apparatus securely holds the photographic material to the drum and occupies a minimal amount of space. The spring means acts on the counterweight to urge the cover member towards the surface of the drum to grip material inserted between the cover member and the drum. Rotation of the drum about the longitudinal axis causes the counterweight to exert a force on the cover member causing the cover member to move toward the surface of the drum, thereby increasing the grip on the piece of material. Sufficient clamping force to hold the material on the drum for loading is provided by the spring means. This clamping force is easily overcome to ease the loading process. The apparatus is counterweighted with a slight imbalance on the far side of the center of rotation. This imbalance provides increased clamping force as rotational velocity increases due to the normal acceleration component of the inertial acceleration associated with a rotating body.

DETAILED DESCRIPTION OF THE PREFERRED EMBODIMENTS

Figure 1:
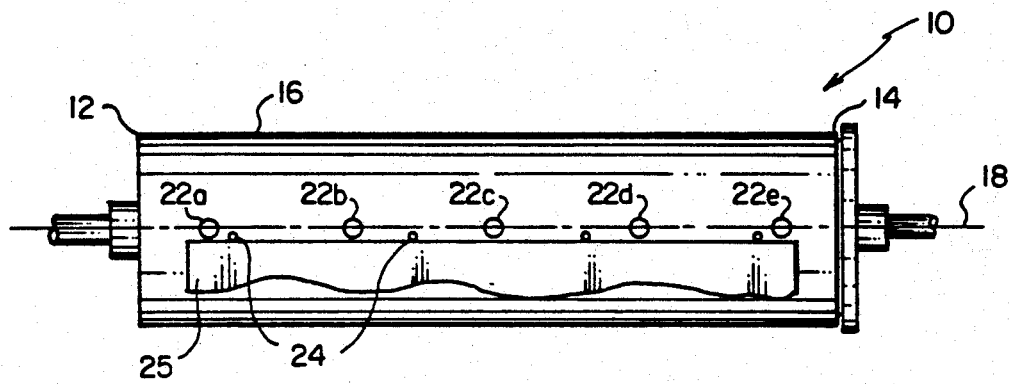
FIG. 1 is a diagrammatic top view of a preferred embodiment of a rotating drum for holding receiver media for image reproduction constructed in accordance with the present invention.

Referring now to the drawings in which like numerals indicate like parts throughout the several drawing figures, FIG. 1 illustrates a photographic material clamping apparatus. The photographic material clamping apparatus includes a rotatable drum 10 which has a first end portion 12, a second end portion 14 and a peripheral surface 16 extending between the first and second end portions 12, 14. A central axis 18 extends longitudinally between the first and second end portions 12, 14. The longitudinal axis 18 is the axis of revolution of the drum 10. A longitudinal opening 20 extends the length of the drum 10 and is preferably parallel to the longitudinal axis 18, but is offset from the central axis 18. A plurality of radial openings 22a-e extend between the drum surface 16 and the longitudinal opening 20. The radial openings 22a-e and the longitudinal opening 20 are preferably bores, but other configurations may be used. Bores are preferable to minimize binding of moving parts due to manufacturing tolerances and paper dust.

The rotatable drum 10 preferably has a plurality of pins 24a-d protruding a small distance from the surface 16 in the vicinity of the radial openings 22a-e. The pins 24 are arranged so that a receiver sheet 25 abuts the pins 24, but does not engage the radial openings 22a-e or interference with any item extending from or inserted into the radial openings 22a-e. The pins 24 need only protrude from the surface far enough to engage the receiver 25.

The drum 10 also has axial openings or bores 26l and 26r which intersect the leftmost and rightmost radial openings 22a and 22e, respectively. The radial bore 26l extends from the first or left end 12 of the drum 10 to intersect radial opening 22a while the right radial opening 26r extends from the right end 14 of the drum 10 to intersect radial opening 22e. The bores 26l and 26r preferably intersect the radial openings 22a and 22e at right angles, but it is to be understood that intersection at other angles can be used. The bores 26l and 26r are preferably smaller in diameter than the radial openings 22a-e, but they could be larger or the same size.

Figure 2:
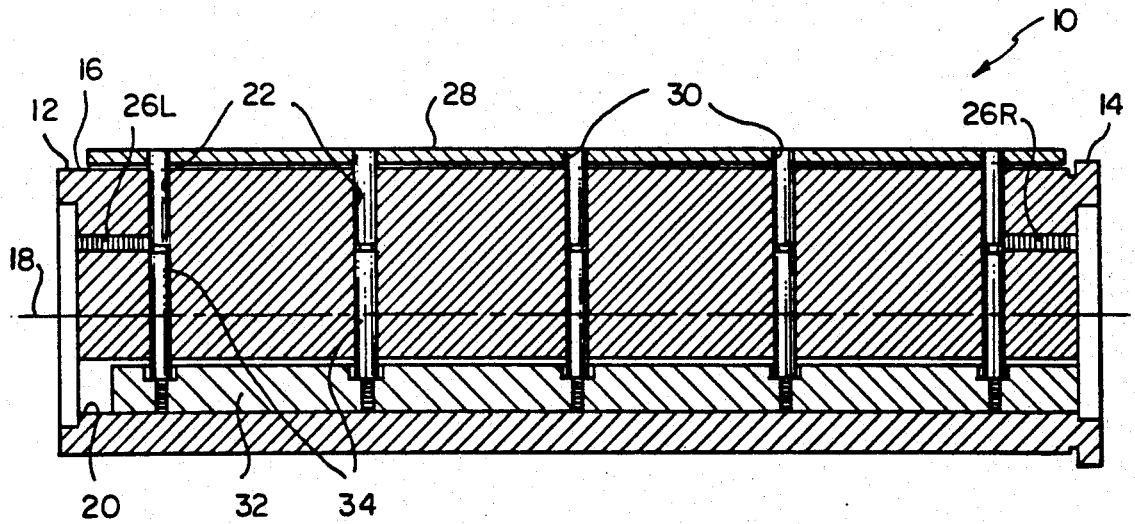
FIG. 2 is a diagrammatic longitudinal sectional view of the rotating drum of FIG. 1.
Figure 3:
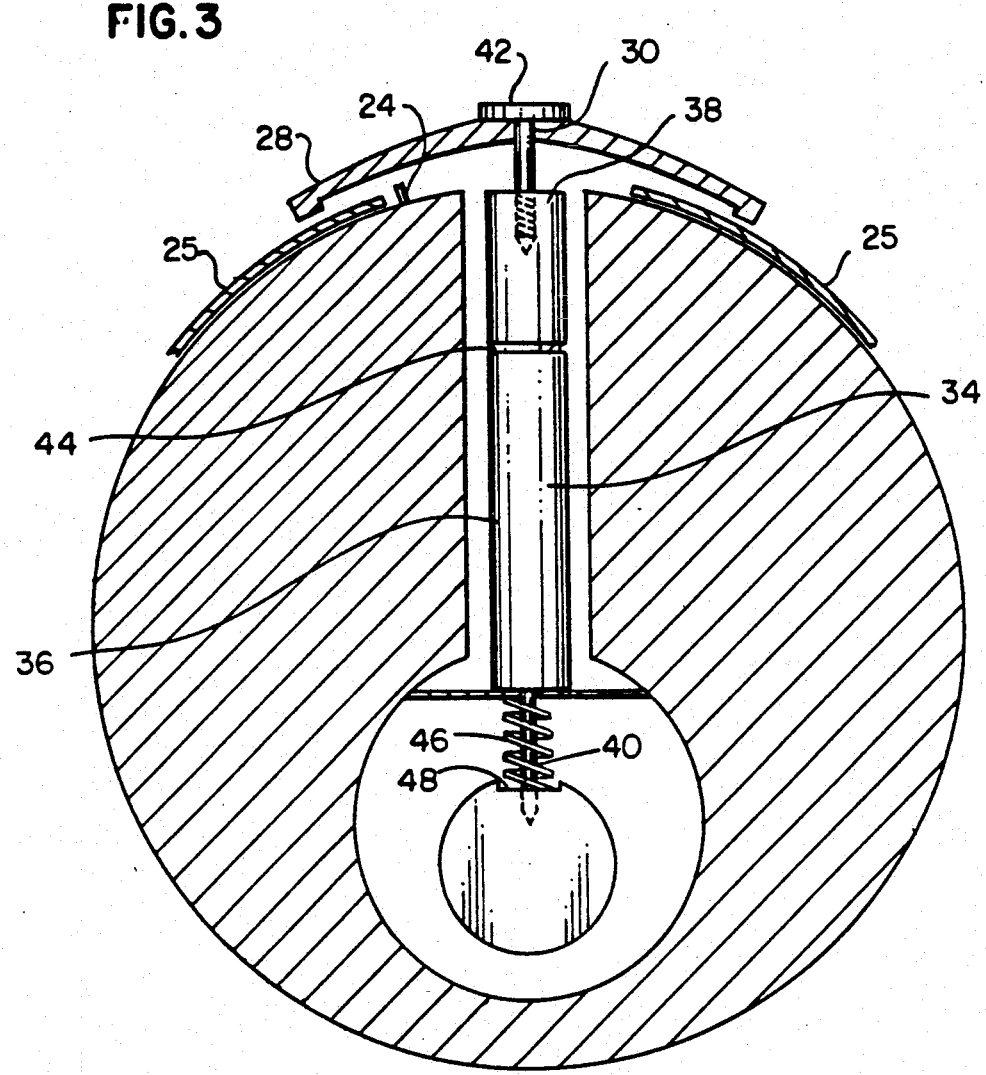
FIG. 3 is a diagrammatic cross-sectional view of the rotating drum of FIG. 1 taken through one of the radial openings.

Referring now to FIGS. 1-3, a cover member 28 overlies the plurality of radial openings 22a-e. The cover member 28 has a plurality of openings 30 allignable with the radial openings 22. The cross-sectional configuration of the cover member 28 is preferably an inverted channel or C-shaped so that the pins 24 fit within the channel while the rails of the channel engage the surface 16 of the drum 10, or while the rails of the channel engage receiver media interposed therebetween. The surface 16 of the drum 10, and the contacting surfaces of the cover member 28, may be constructed of metal that may be machined or coated for better gripping contact with the receiver medium 25 without deterioration of the media, or may be constructed of other materials.

A counterweight 32 is positioned in the longitudinal opening 20 and is connected to the cover member 28. The counterweight 32 is preferably an elongated bar with a plurality of openings allignable with the radial openings 22a-e. The cover member 28 and the counterweight 32 are connected through at least one of the radial openings 22 and preferably connected through each of the radial openings 22a-e. A fastener assembly 34 is used to connect the cover member 28 and counterweight 32. The fastener assembly preferably includes a body portion 36 that is positioned in a radial opening 22, a top end portion 38 that connects the cover member 28 to the body portion 36, and a bottom end portion 40 that has threads for engagement with the openings in the counterweight 32. The top end portion 38 may forcibly engage the openings 30 in the cover member 28, but it is preferred that the top end portion 38 have a threaded bore for receiving the threads of a cap screw 42. Such a cap screw 42 would be inserted through the openings 30 in the cover member 28 with the head of the cap screw 42 overlapping the opening 30. The cap screw 42 would have a low profile to occupy a minimal amount of space.

As is evident from FIG. 2, the left and right openings 22a and 22e differ from the intervening radial openings 22b-d. Likewise, the fastener assemblies associated with these radial openings may also differ from the intermediate fasteners by an indentation or preferably a groove 44. The portion of the fastener assembly 34 inside the bores 22b-d preferably has a hexagonal or other polygonal cross-sectional configuration. It has been found that such a polygonal cross-sectional configuration is preferable to a circular configuration because it minimizes the effects of dust on the operation of the assembly. The end fastener assemblies 34a and 34e are preferably circular in cross section for ease of manufacturing of the grooves 44.

Still referring to FIGS. 1-3, biasing means, such as coil spring 46, act on the counterweight to urge the cover member 28 towards the surface 16 of the drum 10 to thereby grip a piece of receiver media 25 inserted between the cover member 28 and drum 10. The counterweight 32 preferably has a plurality of coil spring seats 48 machined thereon to be aligned with the radial openings 22a-e so that when the drum is assembled, the coil spring 46 is compressed. The coil spring 46 is preferably inserted through the longitudinal bore 20 as the counterweight 32 is inserted. When so inserted, the spring 46 abuts the counterweight 32 and also abuts a corresponding radial opening and is coaxial therewith. When fully assembled, the spring 46 is coiled about the bottom end portion 40 of the fastener assembly 34 and thereby fixed in relative position. It is only necessary to slightly compress the spring 46 so that it pushes against the counterweight 32 and the body of the drum in the vicinity of the actual openings 22. Because the counterweight 32 is connected to the cover member 28, movement of the counterweight 32 caused by the spring 46 will cause the cover member 28 to move in a direction that draws the cover member 28 toward the surface 16 of the drum 10. When rotation of the drum begins, the centrifugal force urges the counterweight 32 away from the central axis 18, which, in turn, draws the cover member 28 towards the drum surface 16.

Figure 4:
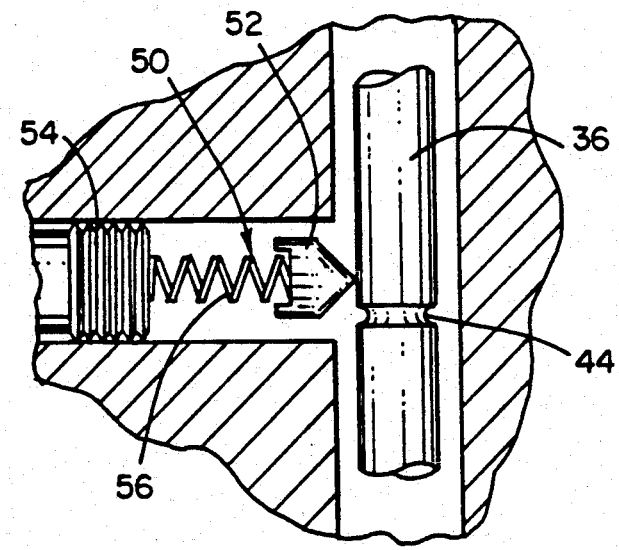
FIG. 4 is a somewhat enlarged sectional view similar to FIG. 2, but illustrating only a portion of the rotating drum about the plunger assembly.

Referring to FIGS. 2 and 4, a plunger assembly 50 contains a spring loaded point 52 which engages the groove 44 of the fastener assembly 34. The spring loaded point 52 is preferably held in position in the axial bore 26 by means of a set screw 54 or the like. The spring 56 may be a simple coil spring that exerts sufficient force on the plunger point 52 for the point 52 to engage the groove 44 and hold the fastener assembly 34 in position. When the plunger assembly 50 engages the groove 44, the cover member 28 is spaced from the surface 16 of the drum 10 a preselected distance for easy removal of the receiver media 25 from the drum 10. The plunger assembly 50 acts as a detent to free both hands of an operator for more carefully removing the receiver media 25.

Operation of the present invention is believed to be apparent from the foregoing description, but a few words will be added for emphasis. To insert receiver media 25, an operator uses one hand to lift the cover member 28 up far enough to insert the media. An alternative is for the operator to lift the cover member 28 sufficiently for the plunger assembly 50 to engage the groove 44 to hold the cover member 28 away from the drum surface 16 for insertion of the media 25. If the operator grabs the cover member 28 by one end or the other, the compression springs 46 will tend to equalize the force so that the cover member rises smoothly and easily. Once the receiver media is placed on the drum, the operator pushes down on the cover member to hold the media in place. By having the plunger assembly hold the cover member up while the receiver media is positioned, the operator has both hands free to align the media. However, the media is easy to align because the alignment pins 24 let the operator know when the top end of the media is aligned against the pins. Once aligned, the cover member is pushed down and the spring force holds the cover member against the media. Sufficient clamping force to hold the media on the drum for loading is provided by the compression springs which force is easily overcome to ease the loading process.

The system is counterweighted with a slight imbalance on the far side of the center of rotation. This imbalance provides increased clamping force as the rotational velocity increases due to the normal acceleration component of the inertial acceleration associated with rotating bodies. When the drum completes rotating, the receiver is removed by lifting up on the cover member against the force of the springs. Again, the plunger assembly can hold the cover member away from the drum so that both hands can be used to remove the receiver media.

It can now be appreciated that the present invention provides a beneficial result. Print time is optimized by reducing the lost space for the clamping system which reduces the overall diameter of the drum for a given size sheet of media. The spring force required for loading force is less than that required when the drum is rotating, thereby easing the loading process making these drum more user friendly. Manufacturing costs are significantly reduced because there are fewer parts.

It can also be appreciated that the present invention clamps both the leading edge and trailing edge of the receiver media against the rotating drum to produce a crisp image. It is a photographic material clamping apparatus that clamps both the top and bottom ends of the receiver sheet while occupying a minimal amount of the circumferential area of the drum thereby conserving space.

While the invention has been described with particular reference to a preferred embodiment, it will be understood by those skilled in the art that various changes may be made and equivalents may be substituted for elements of the preferred embodiment without departing from invention In addition, many modifications my be made to adapt a particular situation and material to a teaching of the invention without departing from the essential teachings of the present invention As is evident from the foregoing description, certain aspects of the invention are not limited to the particular details of the examples illustrated, and it is therefore contemplated that other modifications and applications will occur to those skilled in the art. For example, the present invention contemplates that the receiver media may be loaded and unloaded in darkness with alignment of the media achieved by the alignment pins. It is accordingly intended that the claims shall cover all such modifications and applications as do not depart from the true spirit and scope of the invention.

What is claimed is:

1. Photographic material clamping apparatus, comprising:
   a rotatable drum having first and second end portions, a surface extending between said end portions, a central axis extending longitudinally between said end portions, a longitudinal opening offset from said central axis, and a plurality of radial openings extending between said surface and said longitudinal opening;
   a cover member overlying said plurality of radial openings;
   an counterweight positioned in said longitudinal opening and connected to said cover member; and
   spring means acting on said counterweight to urge said cover member towards said surface of said drum.

2. A clamping apparatus, as set forth in claim 1, wherein said spring means includes a compression spring.

3. A clamping apparatus, as set forth in claim 1, wherein said spring is inserted through said longitudinal bore.

4. A clamping apparatus, as set forth in claim 1, wherein said spring means includes a compression spring positioned in said longitudinal opening adjacent one of said radial openings and abutting said counterweight.

5. A clamping apparatus, as set forth in claim 1, wherein said counterweight is an elongated bar.

6. A clamping apparatus, as set forth in claim 5, including a pin extending from said surface of said drum near said radial openings to limit travel of material inserted between said drum and said cover member toward said radial openings.

7. A clamping apparatus, as set forth in claim 1, including at least two pins extending from said surface of said drum near said radial openings to align material inserted between said drum and said cover member.

8. A clamping apparatus, as set forth in claim 1, wherein said cover member and said counterweight are connected through at least one of said radial openings.

9. A clamping apparatus, as set forth in claim 1, including a fastener assembly extending through one of said radial openings connecting said cover member and said counterweight.

10. A clamping apparatus, as set forth in claim 9, wherein said fastener assembly includes:
    a body portion positioned in said radial opening;
    a top end portion connecting said cover member to said body portion; and
    a bottom end portion having threads for engagement with said counterweight.

11. A clamping apparatus, as set forth in claim 10, wherein said spring means includes a coil spring, said coil spring being encoiled about said bottom end portion.

12. A clamping apparatus, as set forth in claim 10, wherein said body portion has a polygonal cross sectional configuration.

13. A clamping apparatus, as set forth in claim 10, wherein said body portion has an indentation and including a plunger assembly with a plunger releasably engagable with said indentation.

14. A clamping apparatus, as set forth in claim 13, wherein said body portion holds said cover member away from said drum a preselected distance when said plunger engages said indentation.

15. A clamping apparatus, as set forth in claim 13, wherein said drum has an axial opening extending from one of said end portions and intersecting said radial opening, said plunger assembly being mounted in said axial opening.

16. A clamping apparatus, as set forth in claim 1, wherein said drum has an axial bore extending from one of said first and second end portions toward a selected one of said radial openings, and including a plunger assembly mounted in said axial bore, said plunger assembly having a plunger controllably movable into and out of said radial opening 17. Photographic material clamping apparatus, comprising:
    a rotatable drum having first and second end portions, a surface extending between said end portions, a central axis extending longitudinally between said end portions, a longitudinal opening offset from said central axis, and a plurality of radial openings extending between said surface and said longitudinal opening;
    a cover member overlying said plurality of radial openings;
    a counterweight mounted in said longitudinal opening and connected to said cover member through at least one of said radial openings; and
    means for urging said cover member towards said surface of said drum to grip a piece of material inserted between said cover member and said drum.

18. A clamping apparatus, as set forth in claim 17, wherein rotation of said drum about said longitudinal axis causes said counterweight to exert a force on said cover member causing said cover member to move toward said surface and increase the grip on said piece of material.

* * * * *